Feb. 16, 1937.   S. J. EISIN   2,070,719
PNEUMATIC SPRING
Filed June 13, 1936   2 Sheets-Sheet 2
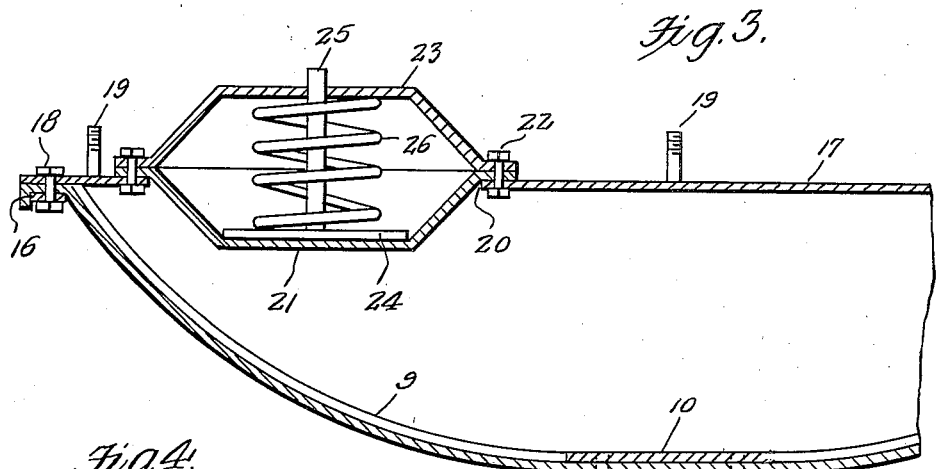
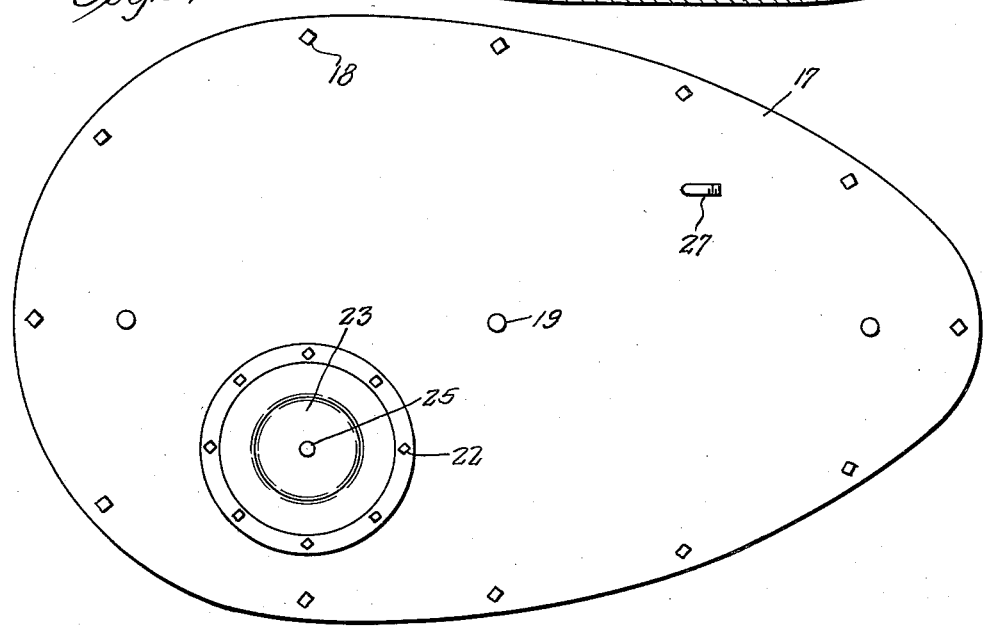
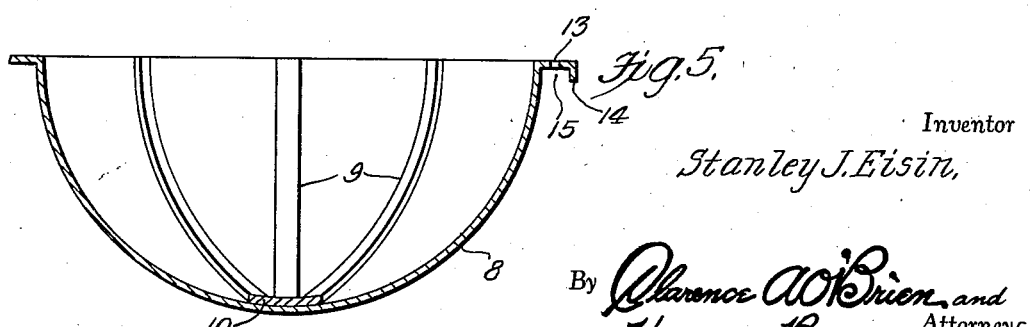
Inventor
Stanley J. Eisin,
By Clarence A. O'Brien and
Hyman Berman
Attorneys Patented Feb. 16, 1937

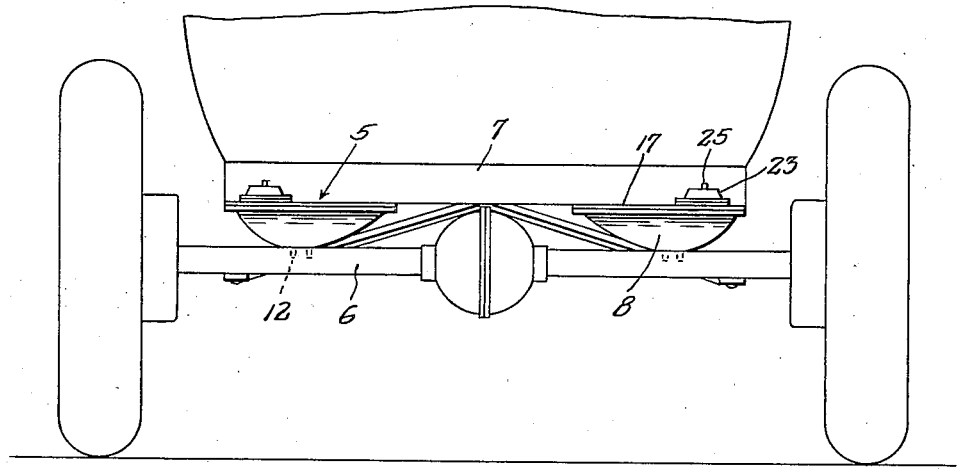
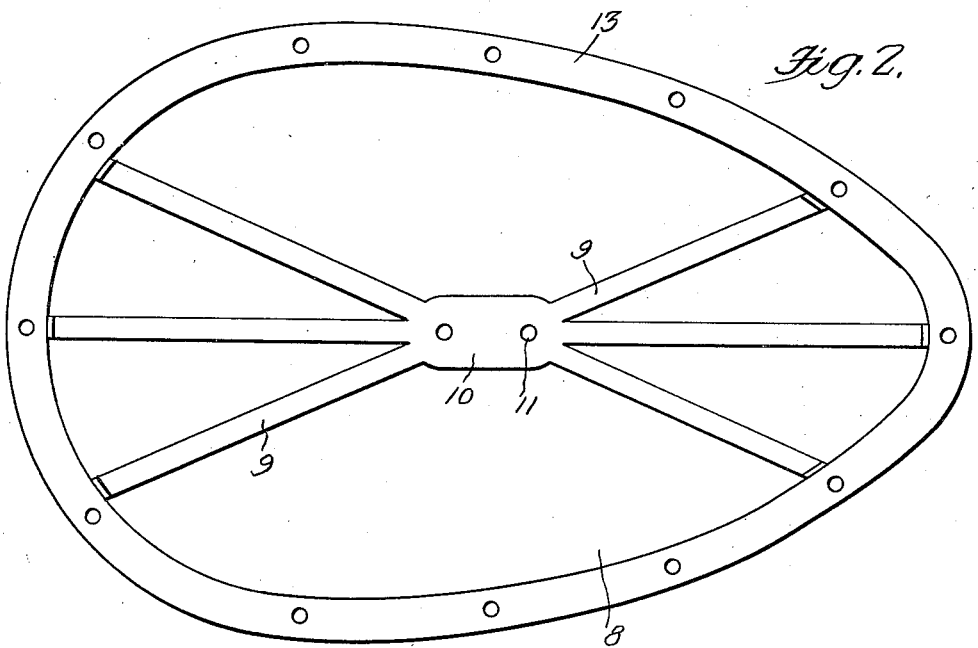
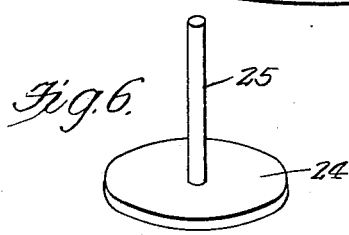

2,070,719

UNITED STATES PATENT OFFICE 2,070,719

PNEUMATIC SPRING

Stanley J. Eisin, Chicago, Ill.

Application June 13, 1936, Serial No. 85,149

4 Claims. (Cl. 267—35)

This invention relates to pneumatic springs and particularly to such springs as are intended for use upon vehicles to relieve the shock to the rider.

An object of the present invention is to provide a spring of the character above mentioned which can be more cheaply constructed than the leaf springs now generally resorted to and which can consequently be replaced more economically.

A further object of the invention is to provide a pneumatic spring for the purpose specified that is characterized by simplicity in construction.

A further object of the invention is to provide a pneumatic spring which will act as a sound deadener in that it will preclude noise originating in the wheel axles being telegraphed to the body of the vehicle as is the case with steel springs.

The invention together with its objects and advantages will be best understood from a study of the following description taken in connection with the accompanying drawings wherein:—

Figure 1 is an elevational view of a rear portion of an automobile illustrating the application of the invention thereto.

Figure 2 is a top plan view of the flexible casing forming part of the invention.

Figure 3 is a fragmentary detail sectional view taken through a portion of the spring.

Figure 4 is a top plan view of the spring.

Figure 5 is a transverse sectional view taken through the flexible casing and

Figure 6 is a perspective view of a spring pressed disk forming part of the invention.

Referring to the drawings by reference numerals it will be seen that I have illustrated the application of a pair of the improved pneumatic springs, indicated generally by the reference numeral 5 to the rear of an automobile. Thus as shown in Figure 1 the springs 5 are interposed between the rear axle housing 6 and the rear portion of the frame 7 of the automobile.

Each of the pneumatic springs 5 comprises a flexible casing 8 formed of rubber or other suitable elastic material. Preferably, casing 8 has a shape corresponding to the shape of one-half of an egg shell, the casing 8 being open at its top, and being substantially oval in top plan.

For reinforcing purposes the casing 8 is provided in any suitable manner with ribs 9 and internally of the casing 8 there is secured to the bottom thereof at about its center an apertured metallic wear plate 10. Plate 10 is provided with openings 11 which accommodate bolts or the like 12 through the medium of which the casing 8 is positively secured to the axle housing 6.

At its top the wall of the casing 8 is provided with a continuous outstanding marginal flange 13 the lower edge of which is bent downwardly as at 14 to provide a channel 15 which receives a continuous clamping band 16.

A metallic cover plate 17 is provided for the top of the casing 8 and is apertured as is also the flange 13 and the retaining ring 16 to accommodate bolts or the like 18 through the medium of which the cover plate is secured in position with the flange 13 of the casing 8 clamped between the marginal edge of the plate 17 and the band 16 as clearly shown in Figure 3.

The cover plate 17, as shown in Figures 3 and 4, is provided with suitably arranged studs 19 through the medium of which the cover plate is secured to the frame 7 of the vehicle. Thus through the medium of studs 19 and the bolts 12 the pneumatic frame is positively secured in position between the frame 7 of the vehicle and the axle housing 6.

At one side of its longitudinal center, and adjacent the largest end thereof the plate 17 is provided with a circular opening 20 which accommodates a diaphragm 21 of rubber or other suitable material. The diaphragm 21 is provided with an apertured marginal edge through the medium of which and bolts 22 the diaphragm is secured in position.

A hood member 23 corresponding in shape somewhat to the shape of the diaphragm 21 is also provided with an apertured flange through the medium of which and bolts 22 the hood 23 is secured in position with the flange of the diaphragm 21 clamped between the plate 17 and the flange of the hood 23 as shown in Figure 3.

Engaging the center portion of the diaphragm 21 is a disk 24 provided with a stem 25 that is accommodated within a suitable opening provided in the crown or top portion of the hood 23. A coil spring 26 is disposed about the stem 25 and has one end bearing against the disk 24 and its upper end bearing against the hood 23 as shown in Figure 3 for normally urging the diaphragm 21 downwardly.

For inflating the casing 8 the cover plate 17 therefore is provided with a suitably arranged inflating valve 27 to which an air hose or the like may be connected for inflating the casing 8.

In actual practice it is intended to make use of four of the spring units 5 two at the rear and two at the front of the vehicle.

From the above it will be apparent that in actual practice, should an obstruction be encountered or a shock transmitted to the spring the casing 8 will de-form and in this connection it will be noted that there will be a de-formation in the diaphragm 21 which will serve to relieve extraordinary compression in the casing 8. When the abnormal load is removed the casing 8 and the diaphragm 21 will re-form at practically the same pressure and thus the air cushion effect is maintained on the re-shaping of the casing as well as on its de-formation. Thus the spring will serve to cushion shock incident to the encountering of an obstruction and in actual practice it will be found that the spring will function noiselessly.

Also the arrangement is such that no lubrication will be required, and of course it will be understood that the casings 8 of the springs may be inflated a greater or lesser amount as may be found desirable according to the load or weight of the vehicle.

It is thought that the utility and advantages of an invention of this character will be had without a more detailed description.

Having thus described the invention what is claimed as new is:—

1. A pneumatic spring comprising a flexible casing having a shape corresponding substantially to the shape of one section of a longitudinally divided egg shell, and having an annular flange at the upper edge thereof, a top plate, a clamping band extending about the casing and cooperating with the marginal edge of the top plate for clamping the flange of the casing between said band and the top plate, said casing being provided in the bottom thereof with means for attachment of the casing to the front axle or rear axle housing, optionally, of a motor vehicle and said top plate being provided with means for securing the top plate to the body frame of the automobile, said top plate being provided with an opening, a diaphragm extending into the casing through said opening and having at its top side a marginal flange resting on the top plate, a hood member having a flange resting on the flange of the diaphragm, bolt means engaging the flanges of the diaphragm and hood and extending through the top plate for securing the diaphragm and hood in position, a disk engaging a center portion of the diaphragm and having a stem extending upwardly through an opening in said hood and a spring disposed about said stem and having an end bearing against the disk and a second end bearing against said hood.

2. A pneumatic spring comprising a flexible casing, a cover plate secured to the casing at the upper edge of the latter, a diaphragm secured to the cover plate and extending inwardly therefrom and spring means engaged with the diaphragm normally urging the same inwardly of said casing.

3. A pneumatic vehicular spring comprising a flexible casing open at its top, a top plate for the casing and secured to the casing, said top plate being provided with an opening, a diaphragm extending into the casing through the opening of the top plate, a hood member disposed over said opening, means securing said hood member and the diaphragm to said top plate adjacent the edge of said opening, and a spring device confined between the diaphragm and said hood member and having bearing engagement with the diaphragm for normally urging the same inwardly of said casing.

4. A pneumatic vehicular spring comprising a flexible casing open at its top, a metallic wear plate in the casing and resting on the bottom of the casing, and reinforcing ribs for the casing extending from the wear plate to the upper edge of the wall of the casing, a cover plate secured to the top of the casing, a diaphragm secured to the cover plate and extending inwardly therefrom and a spring device engaged with the diaphragm normally urging the same inwardly of the casing, said spring device including a stem having an end normally projecting outwardly with respect to said casing.

STANLEY J. EISIN.